(12) United States Patent
Thomas et al.

(10) Patent No.: US 7,702,707 B2
(45) Date of Patent: Apr. 20, 2010

(54) WAVEFORM GENERATION

(75) Inventors: Neil Thomas, Hertfordshire (GB); Peter John Howlett Fox, Hertfordshire (GB)

(73) Assignee: Aeroflex International Limited, Stevenage (GB)

( * ) Notice: Subject to any disclaimer, the term of this patent is extended or adjusted under 35 U.S.C. 154(b) by 1259 days.

(21) Appl. No.: 10/548,115

(22) PCT Filed: Feb. 12, 2004

(86) PCT No.: PCT/GB2004/000532

§ 371 (c)(1),
(2), (4) Date: Sep. 2, 2005

(87) PCT Pub. No.: WO2004/079885

PCT Pub. Date: Sep. 16, 2004

(65) Prior Publication Data

US 2006/0165203 A1   Jul. 27, 2006

(30) Foreign Application Priority Data

Mar. 6, 2003   (GB) .................. 0305143.0

(51) Int. Cl.
*G06F 1/02*   (2006.01)

(52) U.S. Cl. ...................... 708/270
(58) Field of Classification Search ............... 708/270
See application file for complete search history.

(56) References Cited

FOREIGN PATENT DOCUMENTS

| | | |
|---|---|---|
| EP | 0 486 851 | 5/1992 |
| EP | 0 660 560 | 6/1995 |
| EP | 1 037 379 | 3/1999 |
| EP | 1 111 606 | 9/2000 |

OTHER PUBLICATIONS

International Search Report for PCT/GB2004/000532 mailed Sep. 16, 2004.

*Primary Examiner*—Tan V Mai
(74) *Attorney, Agent, or Firm*—Marshall, Gerstein & Borun LLP

(57) ABSTRACT

A waveform generator for generating a smooth version of an original waveform which contains abrupt transitions, includes a phase accumulator incremented at successive sampling times to produce an output representative of the phase of the original waveform, a phase scaler arranged to convert the residual contents of the accumulator following a transition from phase to time, computing means responsive to the time to calculate a number of samples along a smooth transition, each offset by that time from the sampling times, and a sequencer to replace the otherwise abrupt transition with the sequence of samples from the computed smooth transition.

10 Claims, 15 Drawing Sheets

WAVEFORM GENERATION

FIELD OF THE INVENTION

The present invention relates to a method and apparatus for generating an improved waveform, and in particular a waveform containing abrupt transitions.

BACKGROUND

In digital and electronic systems there is often a requirement to generate an analogue waveform from a number of discrete digital samples. This is generally accomplished by using a sample generator of some description to produce a stream of discrete samples at fixed time intervals representing the desired waveform and to input the generated samples to a digital-to-analogue converter (DAC), generally referred to as Direct Digital Synthesis (DDS).

However, certain waveforms are more difficult to produce using this scheme than others. For example, it is relatively difficult to produce an accurate analogue square wave signal from a sampled system because a simple square wave requires an infinite bandwidth to be represented. If the period of the square wave required is not an integer number of samples, the sampled system must approximate the square wave by placing output edges of the waveform on the next available sample. This means that the output edge can be up to one sample time late, the net effect being that the output edge will move back and forth over one sample time. The movement of the output edge is referred to as edge jitter. Such edge jitter is usually not acceptable.

One possible solution to this problem is to use the sample generator to generate a sine wave, which when anti-alias filtered can provide accurate zero crossings. A comparator is then used to create the square wave, with the zero crossings causing an output edge to be generated. However, additional circuitry is required to provide the comparator and necessary two reference voltage generators in addition to control and calibration circuitry. This increases the complexity and expense of the required circuitry. Furthermore, in certain electronic applications the additional circuitry required cannot be physically fitted within the available space, whether this is in terms of discrete components or integrated circuit silicon wafer construction.

Another solution is to vary the frequency of the sample clock so that it is an exact multiple of the edge repetition rate. Varying the sample clock frequency is often not an option when the same clock is used to generate multiple independent sources, as is frequently the case. Another solution is to use a sample clock frequency much greater than the edge repetition rate, for instance 1000 times greater. Again, this possible solution has its own shortcomings. Using a very high sample clock frequency is generally too expensive.

SUMMARY

According to a first aspect of the present invention there is provided a waveform generator for generating a data stream comprising a plurality of data values at predetermined sample times, the data stream being representative of a smooth version of an original waveform, the original waveform including at least one abrupt transition, the waveform generator comprising a phase accumulator arranged to provide an output representative of the phase of the original waveform, the accumulator output being sequentially incremented by a predetermined value at successive sample times, a transition detector arranged to receive the accumulator output and to provide an output signal when the accumulator output is at least equal to a value representative of the phase of the original waveform at the point of an abrupt transition, a phase scaler arranged, in response to receiving the output signal from the transition detector, to determine from the accumulator output the phase difference between the phase represented by the accumulator output and the phase of the original waveform at the point of the abrupt transition and to convert the phase difference to a time value, a data processor arranged to generate a sequence of data values representative of a smooth transition offset by the time value from the sample times and a sequencer arranged to insert the sequence of data values into the datastream.

Preferably, the data processor is arranged to calculate the sequence of data values representative of the smooth transition in accordance with the time value output from the phase scaler.

Alternatively, the waveform generator may further comprise a data storage device having a plurality of predetermined sequences of data values, each predetermined sequence being representative of a smooth transition being offset by a particular value of the time value output from the phase scaler, the data processor being arranged to select the predetermined sequence of data values corresponding to a particular time value that is closest in value to the time value output from the phase scaler.

Additionally or alternatively, the waveform generator may further comprise an offset generator arranged to receive the output from the phase accumulator, to sum the output value with a predetermined offset value and to provide the product of the summation to the transition detector, wherein the transition detector provides a further output signal representative of a further abrupt transition.

Preferably, the predetermined increment value is variable, thereby allowing the frequency of the generated waveform to be varied.

Preferably, the smooth transition substantially corresponds to a gaussian pulse response convolved with a square wave.

According to a second aspect of the present invention there is provided a method of generating a waveform, the waveform comprising a plurality of data values at predetermined sample times, the waveform being a smooth representation of an original waveform, the original waveform including at least one abrupt transition, the method comprising incrementing a phase accumulator by a predetermined value that successive sample times and providing an output from the phase accumulator, the output being representative of the phase of the original waveform, determining when the accumulator output is at least equal to a value representative of the phase of the original waveform at the point of an abrupt transition, determining from the accumulator output at the point of an abrupt transition the difference between the phase represented by the accumulator output and the phase of the original waveform at the point of the abrupt transition and converting the phase difference to an offset time value, generating a sequence of data values representative of a smooth transition offset by the converted time value from the sample times and inserting the generated sequence of data values into the plurality of data values comprising the generated waveforms.

The sequence of data values representative of the smooth transition may be calculated mathematically in accordance with the offset time value, or alternatively may be selected from a plurality of stored sequences.

Additionally or alternatively, an offset value may be summed with the output of the phase accumulator and a determination made when the summed product is at least equal to a value representative of the phase of the original waveform at the point of a further abrupt transition.

Preferably, the smooth transition corresponds substantially to a gaussian pulse response convolved with a square wave. The value by which the phase accumulator is incremented may also be variable.

According to a third aspect of the present invention is a provided a waveform generator for generating a sequence of data values at predetermined time intervals, the sequence of data values being representative of a smooth version of an original waveform, the original waveform comprising periods of constant amplitudes separated by abrupt transitions, the waveform generator comprising a phase accumulator arranged to provide an accumulator output the value of which is incremented by a predetermined value at each predetermined time interval. The accumulator output being representative of the phase of the original waveform, a phase mapper arranged to receive the accumulated output and to generate a modified phase output in accordance with the received accumulator output, and an output generator arranged to output a data value of said sequence of data values in accordance with the modified phase output received from the phase mapper.

The output generator preferably comprises a look-up table having a plurality of predetermined data values each corresponding to a modified phase output value.

Additionally, the phase mapper may generate a constant modified phase output when the accumulator output is representative of a period of the original waveform having a constant amplitude and wherein said constant modified phase output corresponds to a single data value in the look-up table.

Additionally or alternatively, the phase mapper may further comprise comparator means for comparing the accumulator output with one or more predetermined threshold values, the or each threshold value defining the boundary between said periods of constant amplitude in the original waveform.

According to a fourth aspect of the present invention there is provided a method of generating a sequence of data values at predetermined time intervals, the sequence of data values being representative of a smooth version of an original waveform, the original waveform comprising periods of constant amplitude separated by abrupt transitions, the method comprising incrementing a phase accumulator by a predetermined value at successive time intervals and providing an accumulator output that is representative of the phase of the original waveform, modifying the accumulator output as a function of the accumulator output to generate a modified phase output and generating a data value comprising one of the data values of the sequence of data values in accordance with the modified phase output.

Preferably, the generated data value is derived from a look-up table having a plurality of data values each corresponding to modified phase output value.

Additionally, the modified phase output may be a constant value when the accumulator output is representative of a period of the original waveform having a constant amplitude and the constant value corresponds to a single data value in the look-up table.

Additionally or alternatively, the method may further comprise comparing the accumulator output with one or more predetermined threshold values, the or each threshold value corresponding to a boundary between the periods of constant amplitude in the original waveform.

BRIEF DESCRIPTION OF THE DRAWINGS

Embodiments of the present invention are described hereinafter, by way of illustrative example only, with reference to the accompanying figures, of which.

DESCRIPTION OF EMBODIMENTS OF THE INVENTION

Figure 1:
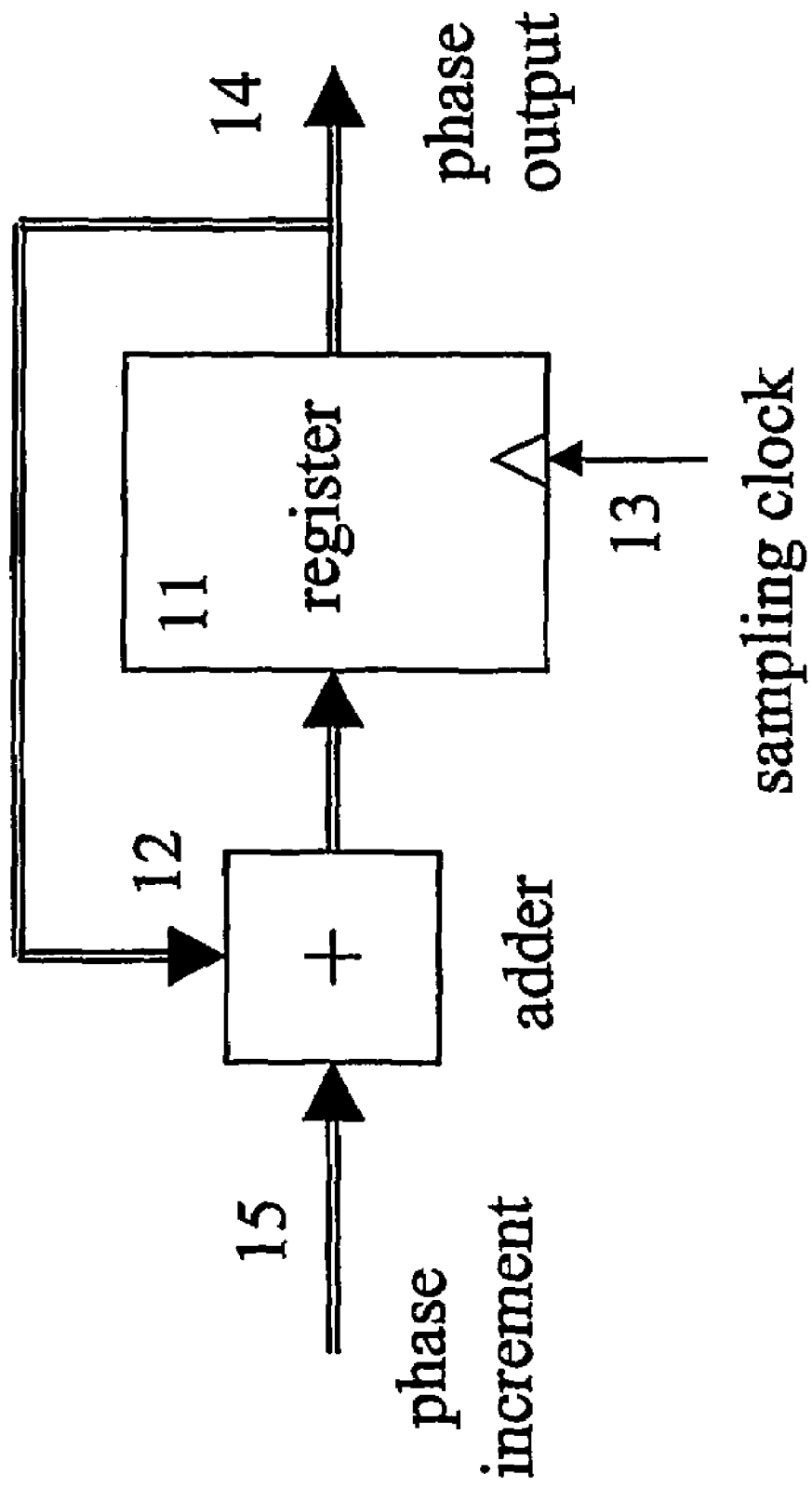
FIG. 1 is a schematic illustration of a prior art accumulator.

FIG. 1 shows the components of a prior art phase accumulator, which is used to keep track of the phase of the required underlying waveform. The phase accumulator consists of a register 11 and an adder 12, the register clocked by the system sampling clock 13. Each clock cycle, the value contained in the register is incremented by the value of the phase increment 15.

The accumulator may be built with any length word, but in practice it is long enough only to achieve sufficient frequency resolution for the intended application. For instance a 32 bit phase accumulator clocked at 100 MHz has a resolution of 23 mHz. The value output by the accumulator is an integer running from 0 to the size of the accumulator-1. However, the output can also usefully be interpreted as a fractional value running from 0 to nearly 1, which represents the phase of the required waveform in cycles, by dividing the output by the accumulator length.

The example shown uses a short 5 bit accumulator for illustrative convenience, rather than a practical length such as 32 bits. However, the extension to any length is obvious. This accumulator can contain any number from 0 to 31 inclusive.

If an increment operation would take its contents to 32 or above on the next cycle, the number is reduced modulo 32 before being stored. In the practical binary accumulator, this is achieved by simply retaining only the bottom 5 bits, and ignoring higher weight bits from the adder, thus an adder output of 32 will be stored as 0 for use in the next cycle.

The example shown is for a phase increment of 3. The value of this increment defines the frequency that will be reproduced. In this case, 32 successive additions will produce 3 cycles of output, the frequency is therefore 3/32nds of the sample rate. The value of the increment may also be regarded as a delta phase, as each addition advances the phase of the accumulator by 3/32nds of a cycle. Other values of increment will produce different frequencies. In particular, an increment of 1 will produce the lowest frequency, which is also equal to the frequency resolution of the phase accumulator.

Table 1 demonstrates the operation of the 5 bit accumulator. It tracks the accumulator contents for three sequences around the point where the MSB changes sign. In the case of an increment of 3, these exhaust all the possible paths through the transition. In general, with longer accumulators and larger increments, there will be many more possible sequences through any given region.

The three possible sequences for this example are tabulated in table 1, around the region at half a cycle, where the count changes from 15 to 16, and the MSB goes from 0 to 1.

TABLE 1

| Sample number | Sequence 11 | Sequence 12 | Sequence 13 |
|---|---|---|---|
| 1 | 12 | 10 | 11 |
| 2 | 15 | 13 | 14 |
| 3 | 18 | 16 | 17 |
| 4 | 21 | 19 | 20 |

In all three sequences, the most significant bit changes sign following sample number 2. The prior art square wave generator will therefore output a transition at sample number 3, which is typically done by outputting the MSB itself.

Figure 2:
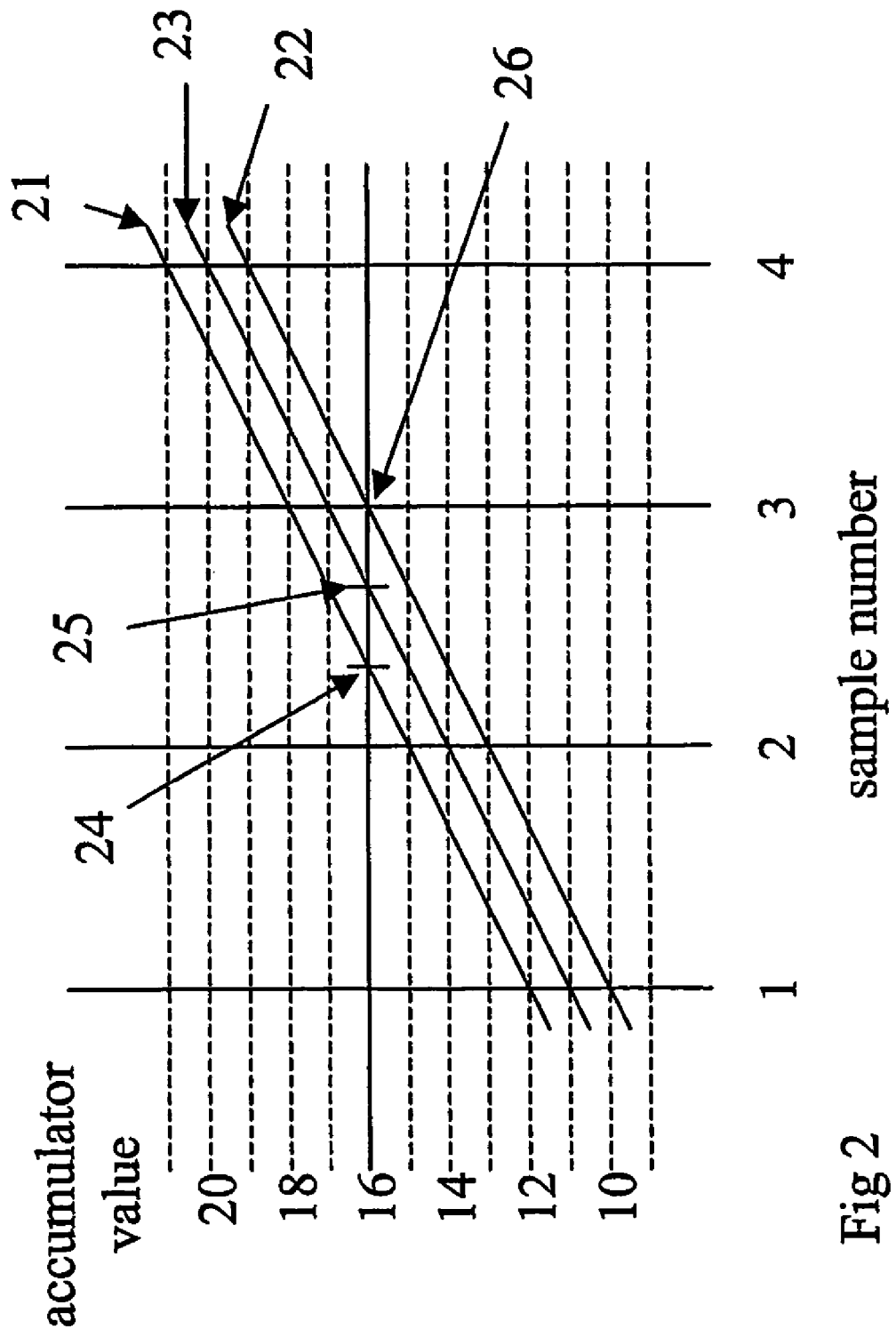
FIG. 2 illustrates a number of typical count sequences of a prior art accumulator.

The phase of each sequence is graphed as a continuous curve in FIG. 2. The point where the transitions of the underlying ideal square wave occurs is the point where the continuous phase crosses defined phase values. For a square wave, these values are conventionally phase=0 cycles, and phase=0.5 cycles, which with a 32 count accumulator correspond to counts of 0 and 16 respectively.

The point at which the continuous phase curve crosses the count of 16 does not generally correspond to a sampling time. When the MSB change occurs in sequence 21 to the value 18, the underlying transition 24 occurs 2/3rds of a cycle before the sample time. When the MSB change occurs in sequence 23 to 17, the underlying transition 25 occurs 1/3$^{rd}$ of a cycle before the sample time. It is only when the MSB change occurs to 16 in sequence 22 that the underlying transition 26 occurs at the sample time.

It can therefore be seen that it is impossible to output an abrupt transition at the correct time, which in general will be unrelated to the predetermined sampling times, while being constrained to make output changes only at predefined sampling times.

Figure 3:
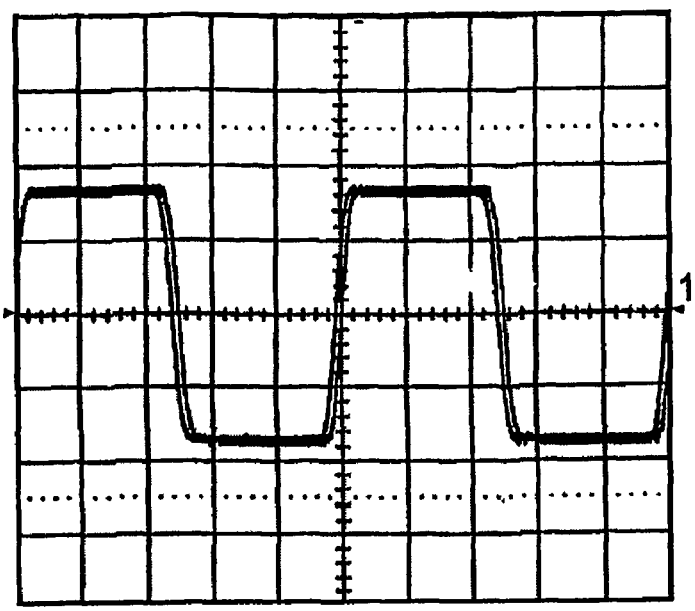
FIG. 3 illustrates the effect of edge jitter in the time domain.
Figure 4:
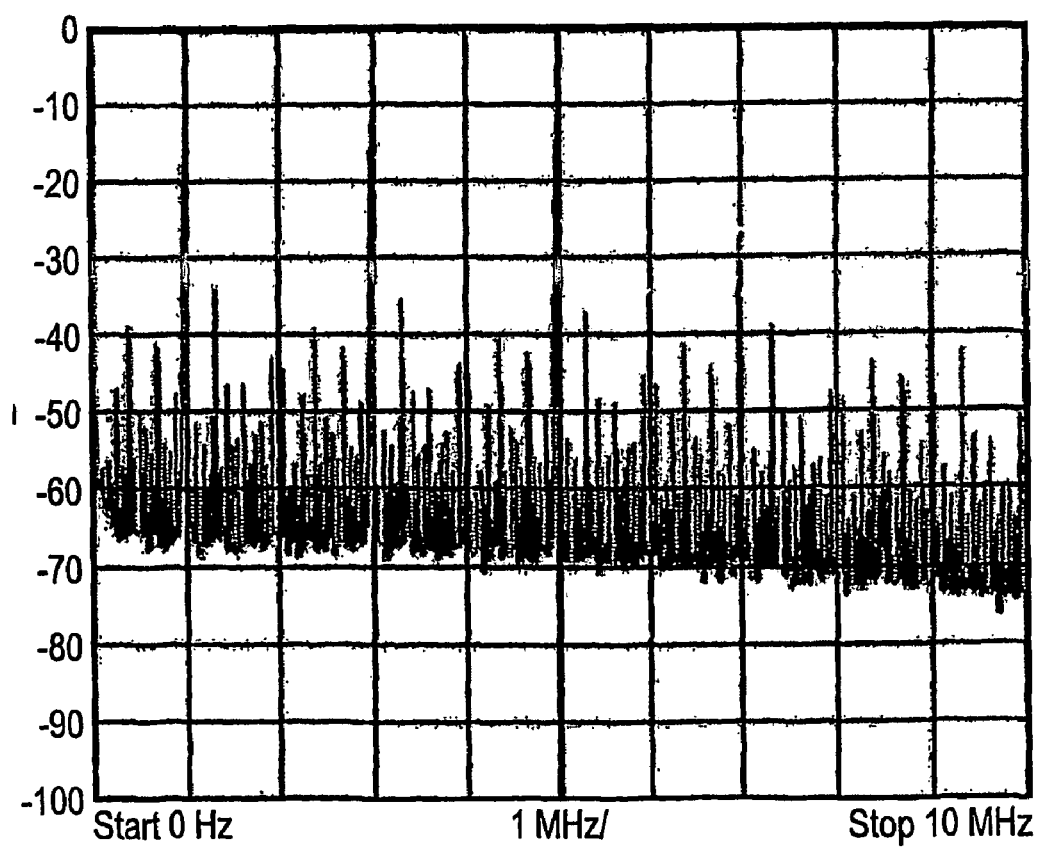
FIG. 4 illustrates the effect of edge jitter in the frequency domain.

The prior art square wave generator resolves this impossibility by not attempting to make transitions at the correct times, but by approximating those times to the sampling times. Moving the output edges away from their correct times in this way introduces jitter. FIGS. 3 and 4 show the effect of this jitter on measurements of the waveform.

FIG. 3 is an oscillograph, which is triggered on the rising edge of the waveform. The source of the signal is a prior art square wave generator followed by an analogue anti-alias filter. It can be seen that each half cycle has been recorded as having two lengths rather than one. As each transition is constrained to occur at a sampling time, each half cycle cannot have the correct duration of N+0.3 sample times. The actual length produced for each half cycle by the prior art generator is either N cycles or N+1 sampling times. The long term average phase and frequency will remain correct, even though individual transitions suffer from jitter.

FIG. 4 shows the corresponding effect in the frequency domain. The large peaks in the spectrum display correspond to the fundamental signal and the first few harmonics that would be expected from a clean square wave. Between the main peaks is a forest of smaller peaks. The presence of these smaller peaks, which are undesired energy, can be explained either in the time domain or the frequency domain.

Figure 5:
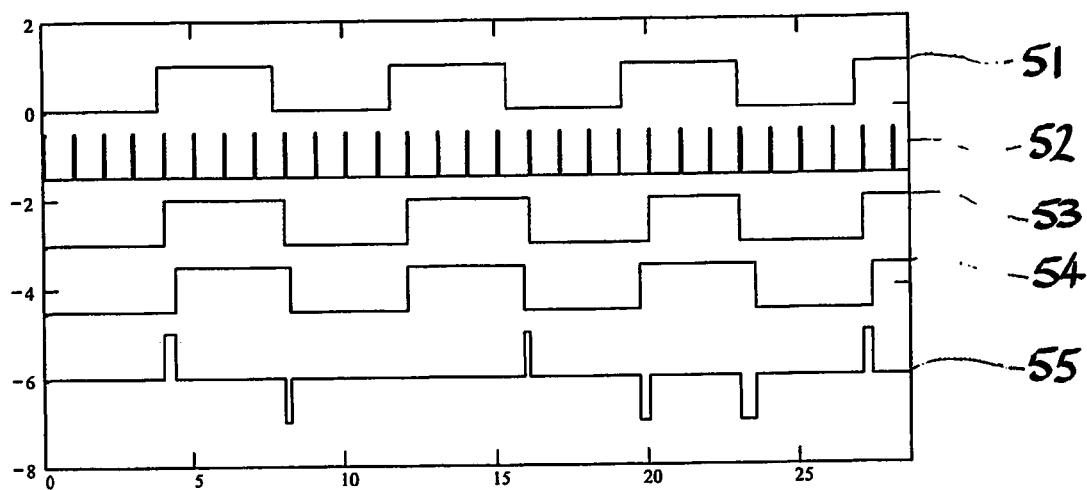
FIG. 5 illustrates the origin of the error signal from a prior art square wave generator.

In the time domain, the movement of each edge away from where it should be is equivalent to the addition of a difference waveform, as shown in FIG. 5. This waveform consists of a narrow error spike for most transitions. In the general case, the polarity and width of these pulses are pseudo random, and so will have a dense, low level spectrum, which is essentially unpredictable in detail. The desired square wave is shown as 51. Trace 52 is the clock waveform, and the result of delaying each edge until the next clock pulse is trace 53, which can change state only at clock pulse times. A copy of the original waveform is shown as 54, this is shifted to provide the best match between itself and the waveform that is actually output 53. Finally the difference between the best match for the output waveform is shown as 55. It is the energy of waveform 55 that is minimised when determining the shift required for the best match for waveform 54. It can be seen how small changes in the timing of the original square waveform with respect to the clock waveform can make individual pulses vanish or invert, rendering the detailed effect of the error waveform more or less unpredictable.

In the frequency domain, the higher harmonics of the square wave, which are implicitly present up to infinite frequency in the description of the underlying square wave, are aliased down to low frequency by the sampling process. In the general case the aliased frequencies, which are N times the fundamental frequency modulo the sampling frequency, are pseudo random. Again, the spectrum is essentially unpredictable in detail.

Figure 6:
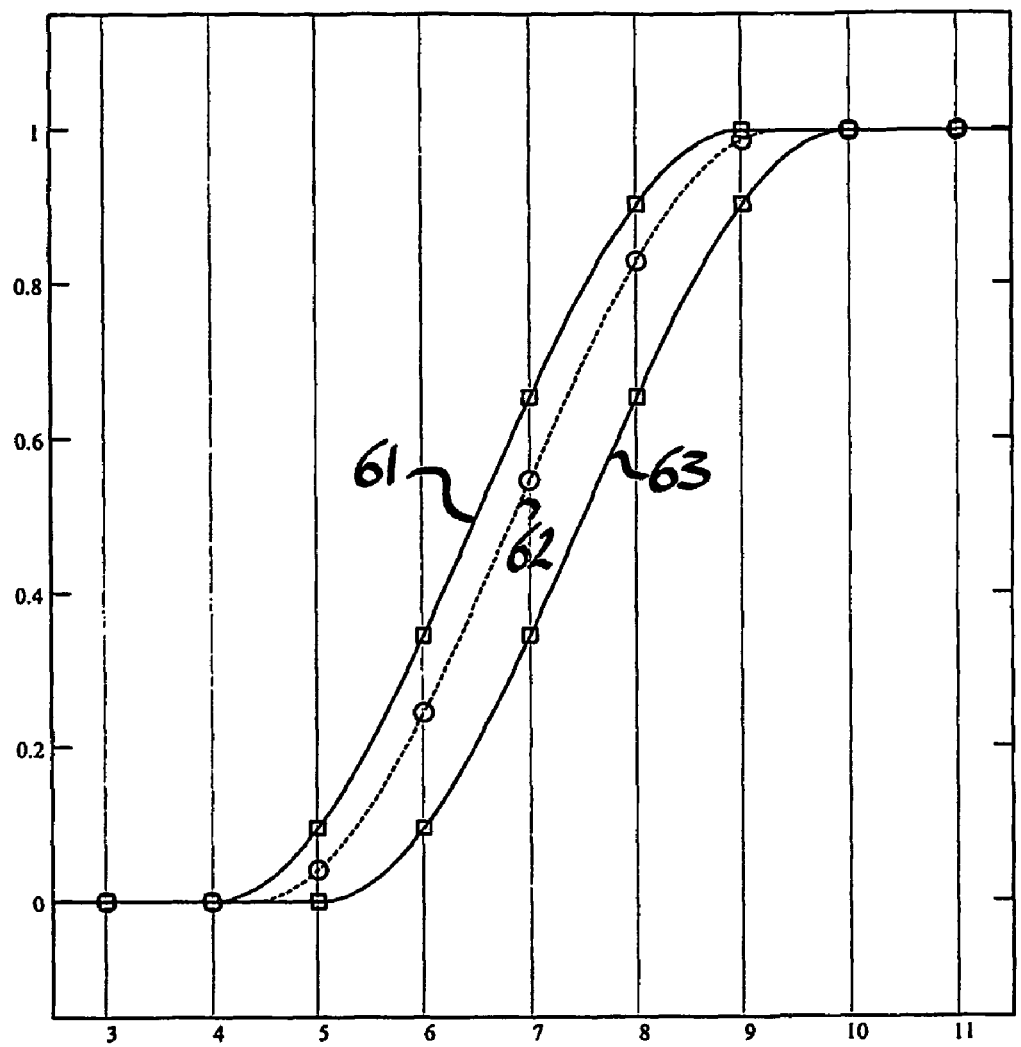
FIG. 6 shows a number of typical filtered transition waveforms according to an embodiment of the present invention.

The solution of the invention is to make an alternative approximation. This is that the edges of the waveform cannot be abrupt, but are allowed to extend for the duration of several sampling times, i.e. the waveform is smooth. This then allows them to be reproduced in their correct positions, even with the constraint that the DAC may make output changes only at regular sampling times. A few members from such a family of edges is shown in FIG. 6. The family is defined across a duration of one sample time. Transitions 61 and 63 represent the earliest and latest that would be used, and transition 62 is a typical intermediate waveform.

The curve used for the edge approximation may be the step response of a realisable filter, or may be a mathematical curve which cannot be realised as a real filter. For instance, a gaussian curve and a half sine curve both have useful properties, but can only be expressed algebraically, rather than generated by the operation of a finite filter. The only constraints on the curve are that the edge must be compact in time, so as to provide a steep edge to approximate the transition, and compact in frequency, to remove the high harmonics of the square wave.

Figure 7:
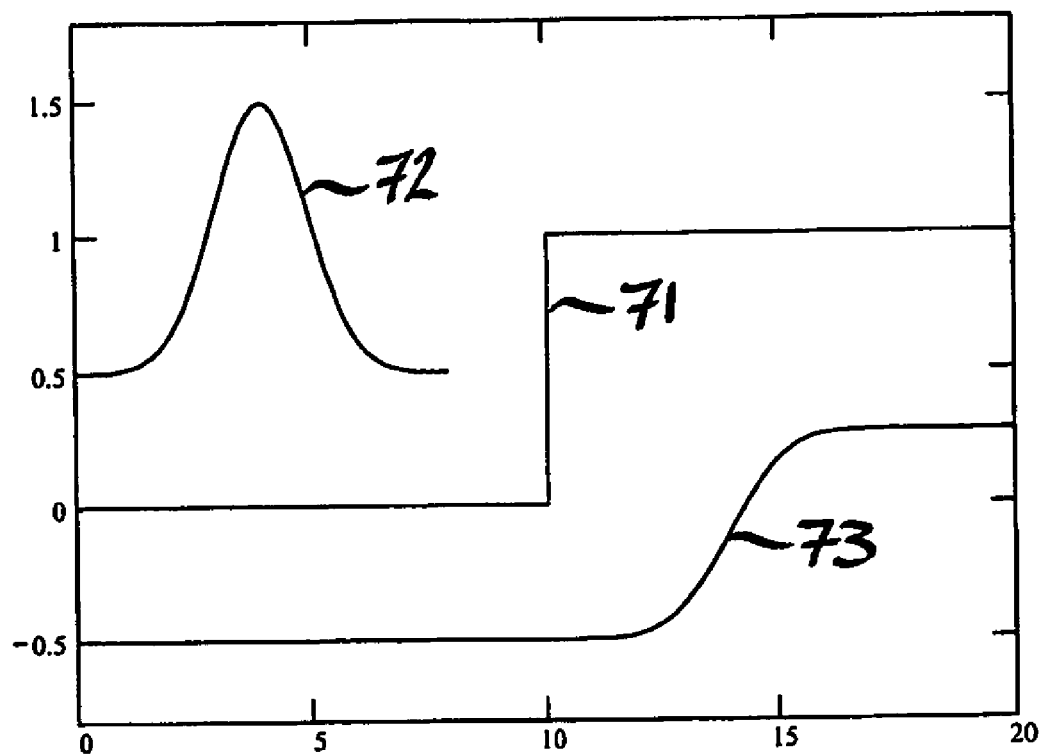
FIG. 7 shows the relationship between an abrupt step, a gaussian pulse, and the filtered edge produced.

The prototype waveform chosen for the approximation is the result of convolving a Gaussian pulse response with the square wave. A gaussian curve is one of the best to use for compactness in both the time and frequency domains. There are two parameters to choose when making this approximation to a square wave. The first is the overall width of the curve, in this case 8 sample times has been chosen as a good compromise, which will give the resultant approximate square wave a transition sequence 8 samples long. The second is the accuracy of the gaussian pulse itself, in this case it has been truncated at sigma=4, (i.e. it extends over a period equal to 8 times the Standard Deviation) again a good compromise. Other applications may use other values with corresponding benefits in either the time or frequency domain. FIG. 7 shows the effect of the convolution operation. One transition from the original square wave is shown as 71, the gaussian pulse as 72, and the resulting filtered transition which results from their convolution as 73.

Figure 8:
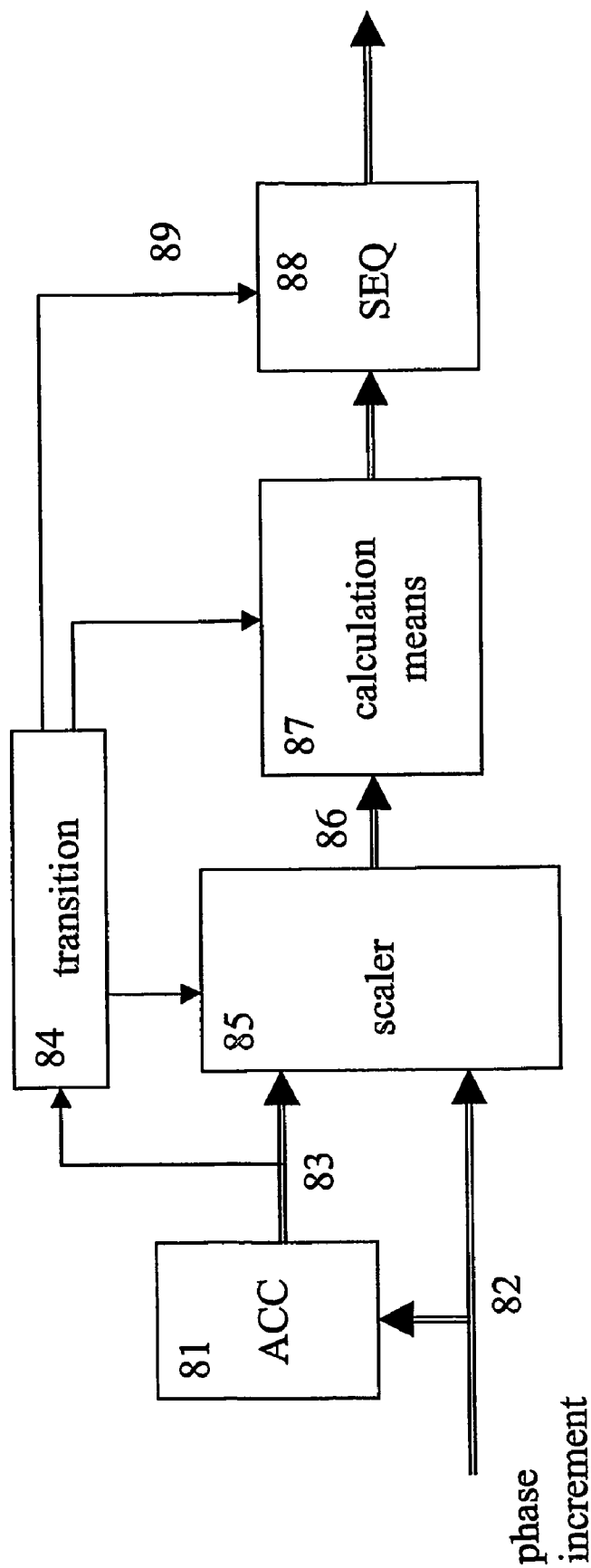
FIG. 8 is a schematic illustration of a waveform generator according to an embodiment of the present invention.

A first embodiment of the invention is shown in FIG. 8. The phase of the desired waveform is computed in a prior art phase accumulator 81, which is incremented on each clock cycle by a phase increment 82.

Each transition on the MSB of the phase accumulator output 83, which would be the square wave output of a prior art square wave generator, is detected by the transition detector 84. This signals the scaler 85 to operate on the residual contents of the phase word 83 immediately following the transition, by dividing it by the increment 82. The result of this division 86 is the time difference between the theoretical transition of the underlying waveform, and the following discrete sampling time which signals the transition. Referring back to FIG. 2, it can be seen in sequence 11 that when the residue was 2, and the phase increment was 3, the point at which the accumulator contents crossed the '16' line was $\frac{2}{3}$rds of a sample before the sampling time.

Following the edge occurrence being signalled, the calculation means 87 must compute a series of points on the transition curve. Given an offset time 86 from the divider, these points will be at times offset+N, where time is expressed in units of the sample time. N varies from 0 to Nsteps−1, where Nsteps is the number of steps to be used for the transitional waveform. It will be appreciated that the calculated points always occur at a sample time but the value of the points varies, the net result being that the overall curve is offset.

The samples from the calculation means are provided to a sequencer 88, together with the edge signal 89. The edge signal indicates the requirement for a transition, with its polarity indicating the direction that the transition should occur in. Although the calculation means may not finish its calculations until many samples after receiving the edge signal, the sequencer is able to construct a delayed version of the required waveform, by delaying all output samples by the same amount. This amount is chosen to be sufficient for the operation of the scaler, and for the completion of the sample calculations.

The waveform from the sequencer now has an edge which occurs a consistent time after the theoretical edge would have occurred, rather than a delay time which varies due to being approximated to the nearest sample time as in the prior art. The length of this delay, the latency between the value reached in the phase accumulator and the output, is of no consequence to the quality or form of the square wave signal. If the absolute time of the output signal is of importance, then this delay, often called a pipeline delay, can be managed by advancing the phase of the phase accumulator by the known amount of the delay.

It will be apparent that the square wave is a special case of rectangular waveforms, having a duty cycle of 50%. It is often required to generate waveforms with other duty cycles, which may have their own special applications. A waveform with a 33% duty cycle has no $3^{rd}$ harmonic, a waveform with 20% or 40% duty cycle has no $5^{th}$ harmonic. A waveform with a very small duty cycle approximates to a pulse, and has a relatively flat harmonic spectrum at low frequencies. It is often required to generate waveforms with a duty cycle variable from 40% to 60% to test the operation of equipment inputs which must continue to operate with variations from a nominal 50% duty cycle.

Figure 9:
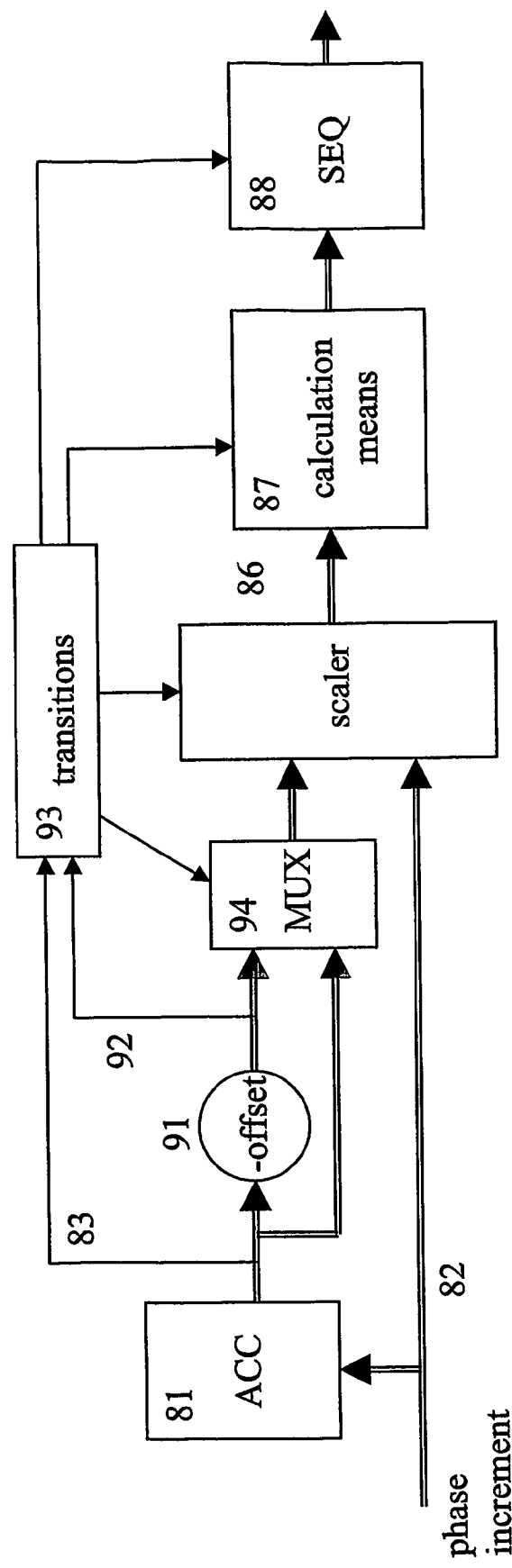
FIG. 9 is a schematic illustration of a waveform generator according to a first embodiment of the present invention.

In a further embodiment of the invention, FIG. 9, the accumulator 81 is followed by an offset subtractor 91. In the first embodiment, the two events per cycle that defined transitions were the positive going and the negative going transitions of the MSB. These events, by their nature, define a 50% duty cycle. The effect of the subtractor is to define a second point in the cycle which can be used to signal a transition. Now, the signals for the two output transitions are a transition on the MSB of the accumulator value 83, and a transition on the MSB of the offset accumulator value 92.

A transition detector 93 monitors the MSB of each value. The hardware will not be set to produce two transitions which overlap, the scaling and transition computing hardware may therefore be shared by both transition events, using the multiplexer 94 to choose the correct number that represents the residue following the signalled transition.

The direction of the output transition is now signalled by which transition event caused the transition, rather than the polarity of the accumulator MSB.

Figure 10:
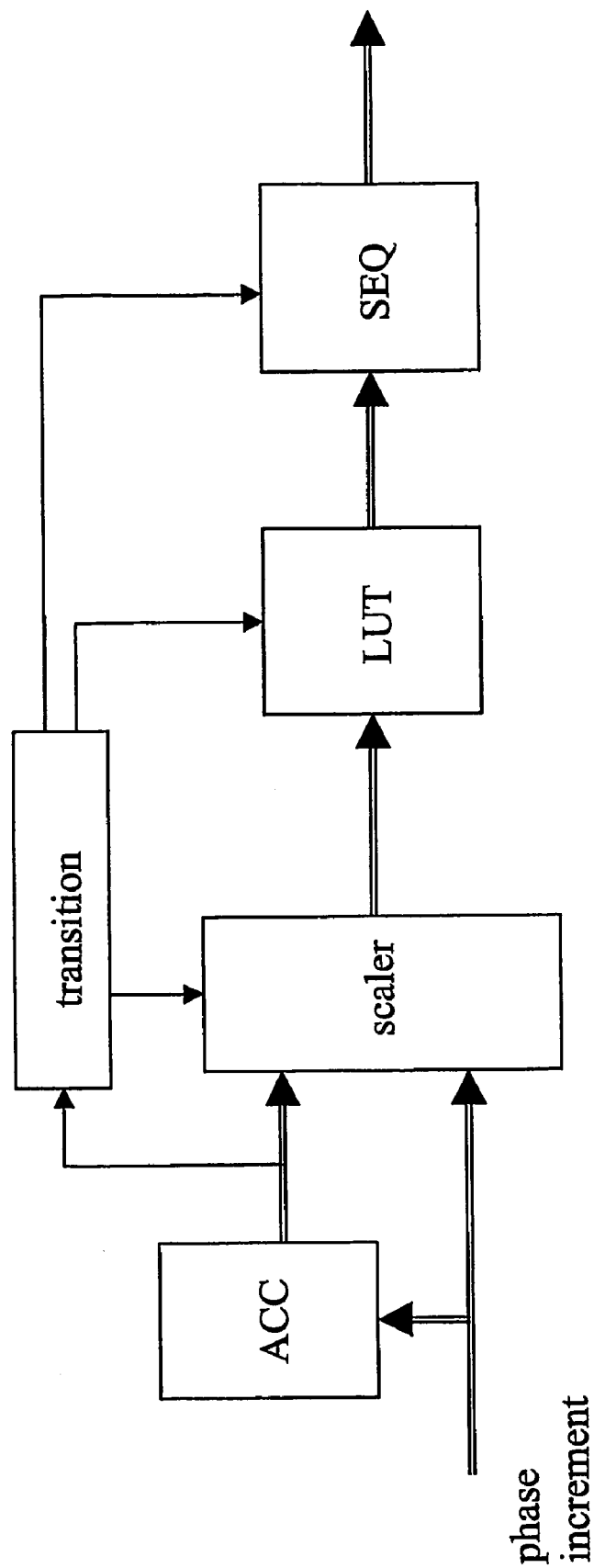
FIG. 10 is a schematic illustration of a waveform generator according to a second embodiment of the present invention.

In a further embodiment of the invention, FIG. 10, the calculating means is replaced by a lookup table 101, which stores a number of precomputed transition waveforms, each of which represents a transition having a different effective delay time. Three of such waveforms are shown in FIG. 6. Typically many more waveforms will be stored, for instance 64. It is now the function of the sequencer to select the waveform having the nearest delay to that output by the divider, and to sequence this waveform onto the output.

In the previous embodiment, the calculation means could work to as much precision as was produced by the phase accumulator. However, the number of address bits used to select a waveform from the LUT will typically be many fewer than produced by the phase accumulator. The wide word from the accumulator must be reduced to the same width as the address word by truncation or rounding.

In applications where real time modulation is not necessary, the phase increment will remain fixed for long periods of time. In this case it is more efficient to implement the scaling function by computing the reciprocal of the phase increment once when the output frequency is set up, and then to multiply the residual by this factor rather than using division. In applications where the frequency of the square wave is required to be modulated in real time, then the value of phase increment will be changed in real time, and the scaler must be implemented by real time division.

A normal lookup table DDS is well known in the art. As an alternative to computation of the transition times of a square wave, it may be thought possible to store a complete cycle of a filtered output waveform in a lookup table which maps waveform phase to waveform voltage. However, this can easily be seen to be impractical. Consider a 1 Hz waveform that must be produced from a signal generator having a 100 MHz clock. The LUT will be required to store 100M samples. Efficiencies such as symmetry could be employed to reduce the number by a factor of two or four, but even 25M samples is not a practical table size. Another unique curve will be required for each duty cycle ratio that is required to be produced.

A further embodiment of the invention seeks to address the problem by noting that the waveform well away from the transitions contains no information, that is it is a consistent high or low. It is only in the vicinity of the transitions that the non-trivial samples are required to be stored in the LUT.

Figure 11:
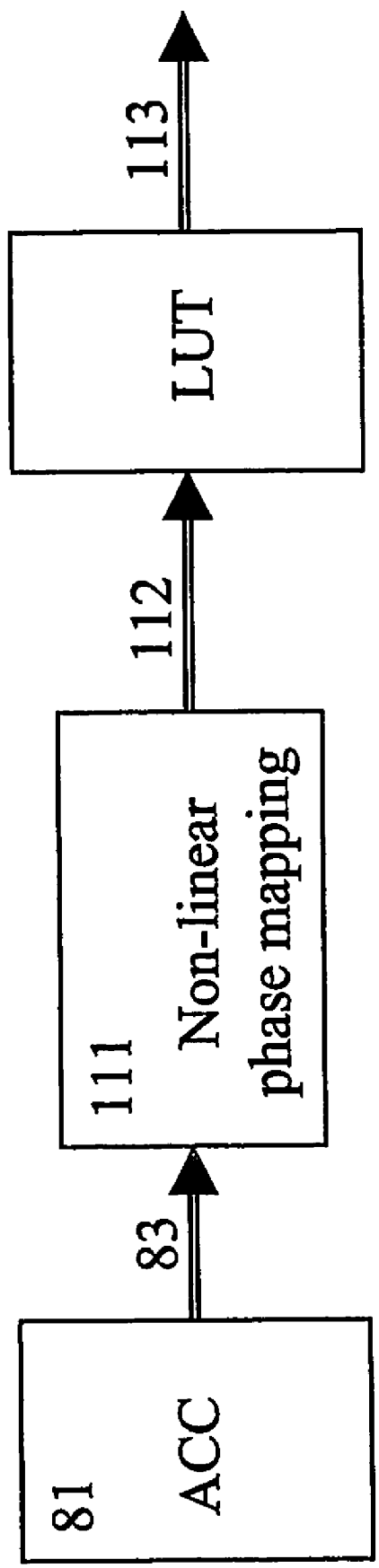
FIG. 11 is a schematic illustration of a waveform generator according to a third embodiment of the present invention.

Accordingly, a non-linear mapping is used between the phase accumulator and the LUT, as shown in FIG. 11. The relationship between the numerical values on the ports of the components of FIG. 11 is shown in the graph in FIG. 12. All numbers are interpreted as having values 0 to 1. The value of the phase word 83 from the accumulator is represented on the x axis 121. Similarly the axis 122 shows the value of the non-linearly mapped phase 112, and axis 123 shows the value of the LUT output 113, which is also the output from the invention.

The phase word 83 is divided into four regions, named according to the output produced from the LUT. These are steady high 124, low going 125, steady low 126, and high going 127. The boundaries are defined in terms of phase. If the boundaries maintain their phase value while the frequency of the square wave generator is varied, then the time duration of the transition regions will vary correspondingly. As the ideal duration of the transition is the minimum consistent with the spectral performance required, it is appropriate to reset the transition boundaries as a function of the generator frequency whenever changing that frequency, to maintain the transition duration constant at this minimum. It will be obvious that if a very high frequency waveform is being generated, a significant fraction of the whole cycle will be devoted to the transition, whereas for a low frequency square wave, only a small fraction of the cycle will be used.

The function of each part of the non-linear mapping will now be described with reference to FIG. 12. All input phases that fall in the steady high part of the cycle 124 map to a single output, which when applied to the LUT following, produce the maximum output from the LUT. The input phases that fall in the low going region 125 are mapped linearly onto the LUT inputs that produce the low going half cycle. As the phase from the accumulator progresses through this region, the LUT produces outputs which follow the stored waveform down. The mappings for the steady low region and the high going region are equivalent to and inverted from the previous mappings described.

There is a choice of waveforms for the LUT 113. FIG. 12 shows curves which are generated using a sinewave LUT. This would be advantageous in a versatile test instrument, as the LUT may be the same one that is normally employed when sine wave output is required, or be implemented as a COORDIC algorithm. Whereas use of a sine wave transition gives a very significant improvement over the performance of the prior art generator, other waveforms, such as an integrated Gaussian, are even better.

Figure 12:
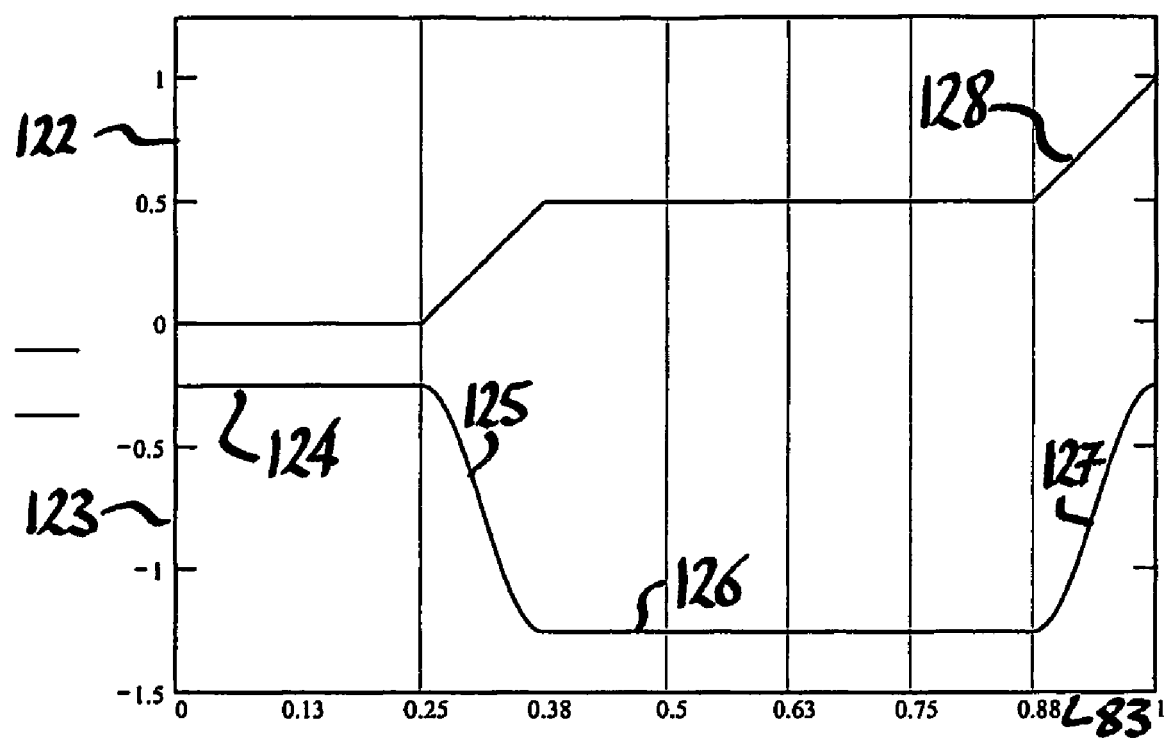
FIG. 12 illustrates the relationship between accumulator phase, mapped phase, and output waveforms for an embodiment of the present invention.

The LUT of FIG. 12 and the LUT for 1 Hz are different sizes, and have different contents. It would be necessary to have a very large RAM based table, rather than ROM, which was re-written at every change of frequency, that or the necessity to have a different table for each frequency. Either of those would be very expensive. The non-linear phase mapping does two things. It allows a small table, or COORDIC algorithm, which encodes only the rising and falling portions of FIG. 12, to do the job of the whole curve of FIG. 12. It also allows one small table to be used for any frequency, by changing the mapping, rather than changing the contents of the table.

Figure 13:
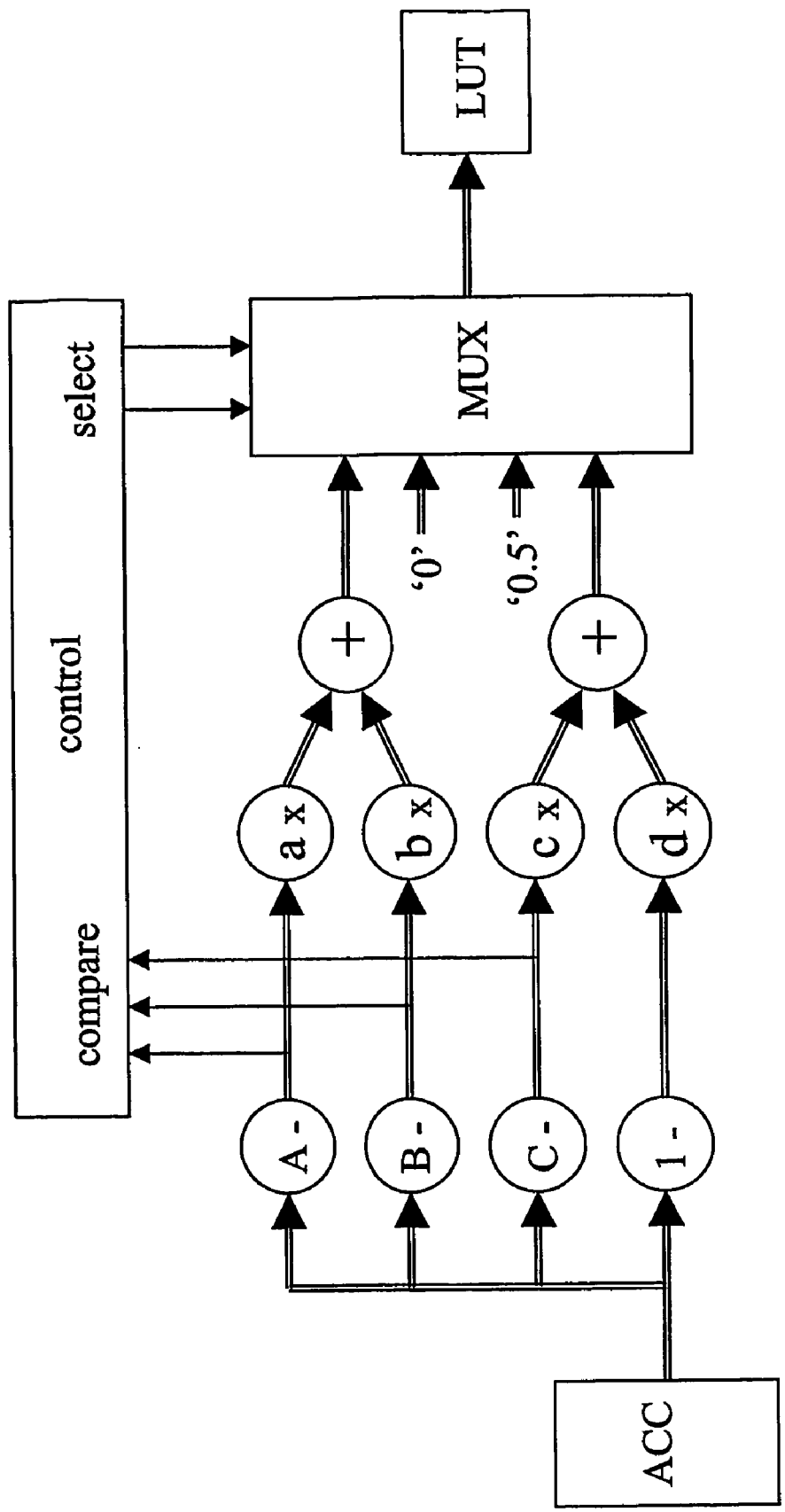
FIG. 13 is a schematic illustration of a waveform generator according to a further embodiment of the present invention.

The mechanism required to produce the non-linear mapping is shown conceptually in FIG. 13. Four subtractors 131 are used to compare the input phase with the boundaries of the mapping regions 128. When the output of the subtractor is positive, the input phase is less than the respective boundary. By comparing which of the subtractor outputs are positive and which negative, which may be done by observing the MSB of each number only, the control block 132 can determine in which region the input phase lies. It then drives the multiplexer 133 to select the fixed values of 0 for region 124, and 0.5 for region 126. The regions that are linearly mapped are obtained by using the weighted sum of the distance of the input phase from both boundaries. The weighting is applied using multipliers 134 and summers 135. The appropriate output is selected in the multiplexer 133.

FIG. 13 is a conceptual implementation which shows all the operations required for a general mapping. The practical implementation of FIG. 14 has removed all of the operations that are redundant in FIG. 13, when the savings inherent in using 0 and 0.5 as the fixed outputs are realised.

Figure 14:
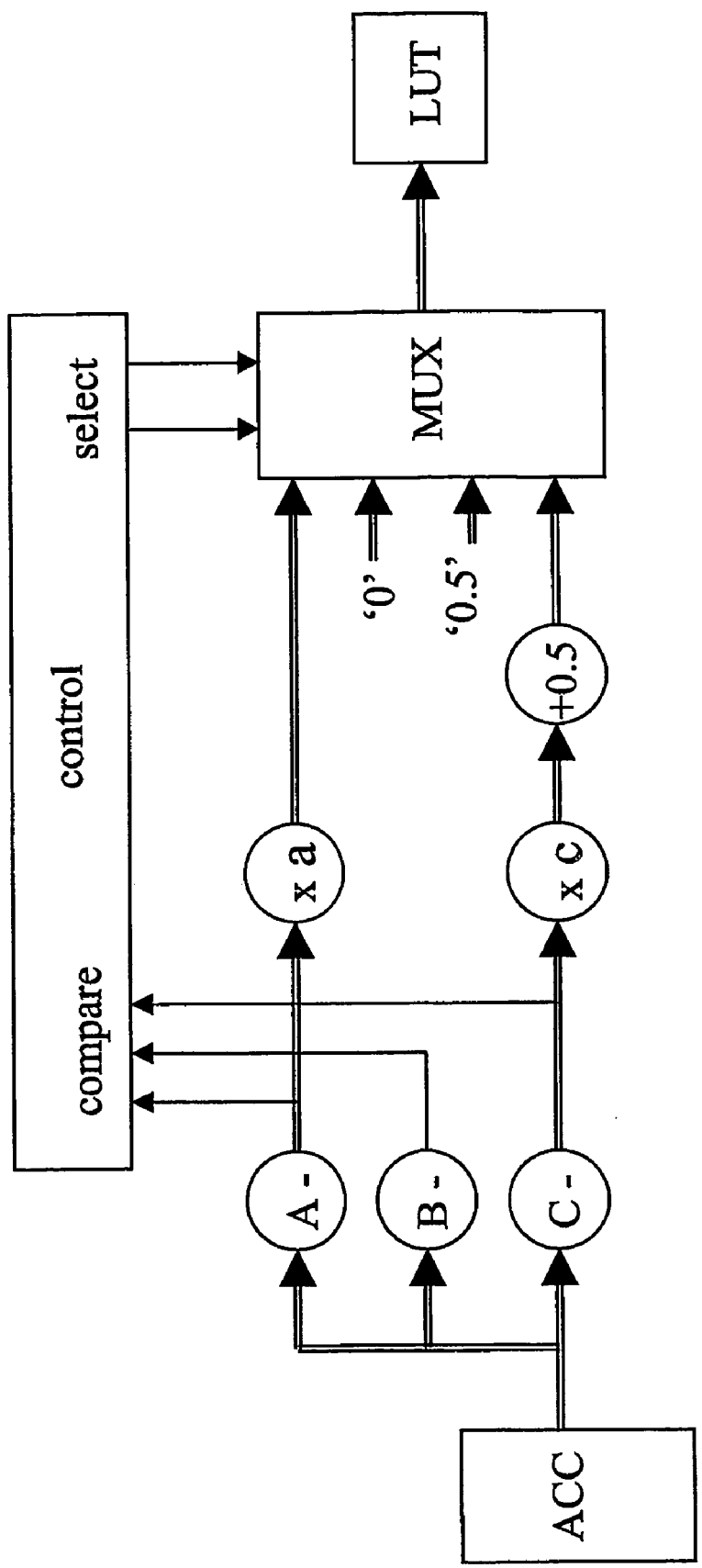
FIG. 14 is a schematic illustration of a waveform generator according to a further embodiment of the present invention.

It will be apparent that the two multipliers are never required simultaneously in FIG. 14, and so a further simple rearrangement is possible to multiplex one multiplier to serve both duties, under control of the control block 132.

FIG. 14 is still more general than may be required. In particular, the boundaries A, B and C are all able to be moved to any general position in the cycle. If each boundary position is restricted to lie on multiples of $2^n$, then the further hardware simplification of FIG. 15 becomes possible. Instead of comparing the accumulator phase across the whole word width of the phase word, it needs only be compared with the top few bits. This is because the restriction to boundaries on $2^n$ boundaries forces all of the lower bits to zero on the boundaries.

It will be appreciated that restricting the transition duration to powers of 2 will prevent the length of the transition waveform being held constant as the period of the square wave is changed. The best that may be done is to choose a length that falls within a range of 2, for instance keeping the transition length at 8 or more samples, and less than 16 samples. If the application can tolerate this variation in waveform shape with frequency, then the hardware saving of FIG. 15 over FIG. 14 may be useful.

Figure 15:
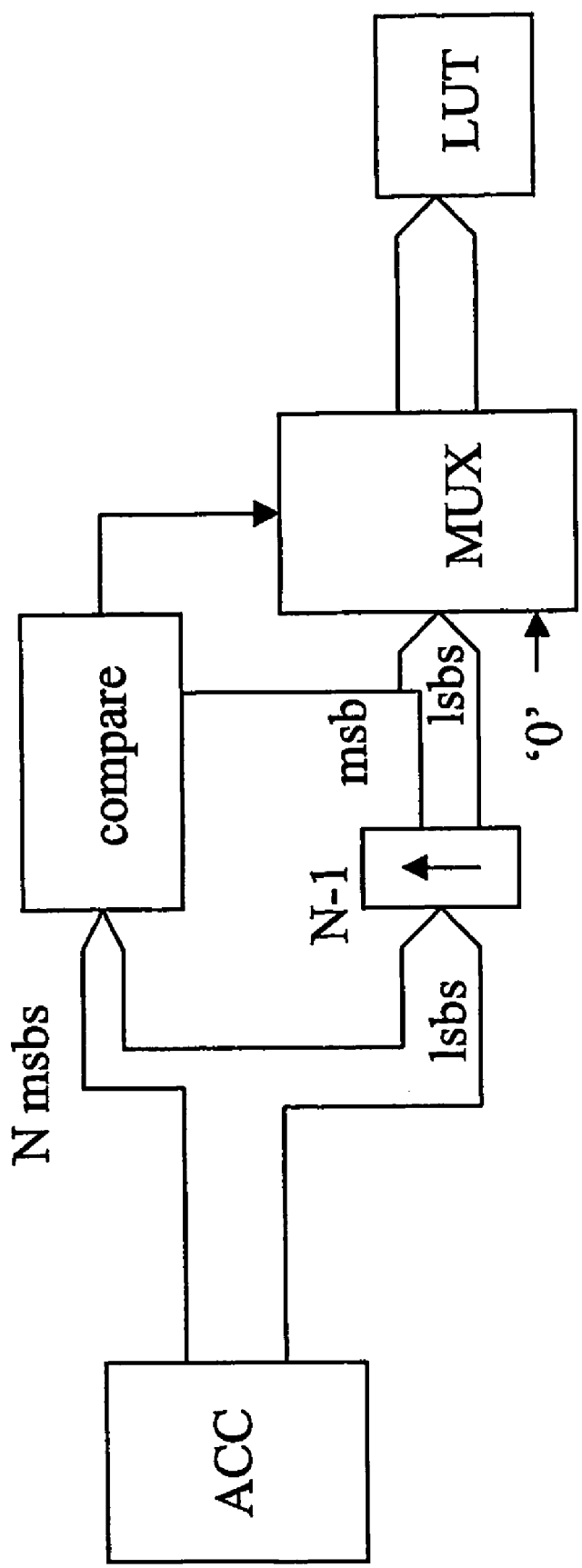
FIG. 15 is a schematic illustration of a waveform generator according to another embodiment of the present invention.
Figure 16:
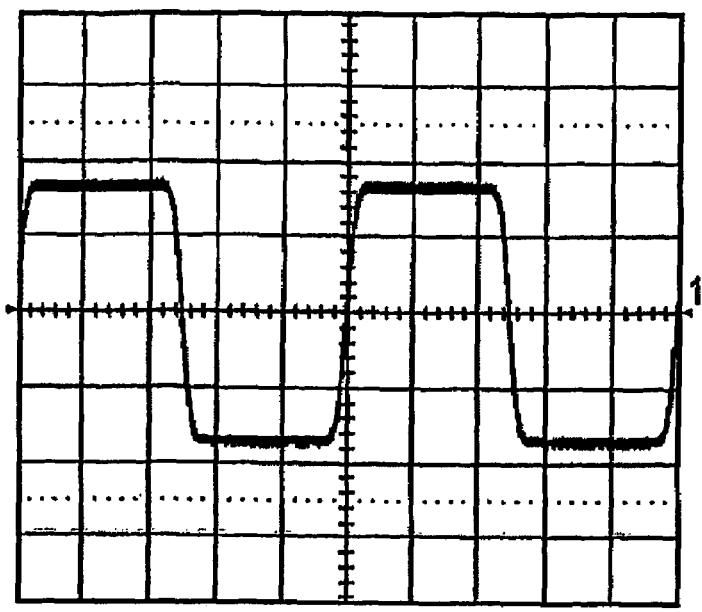
FIG. 16 illustrates the reduction in edge jitter in the time domain of an embodiment of the present invention.
Figure 17:
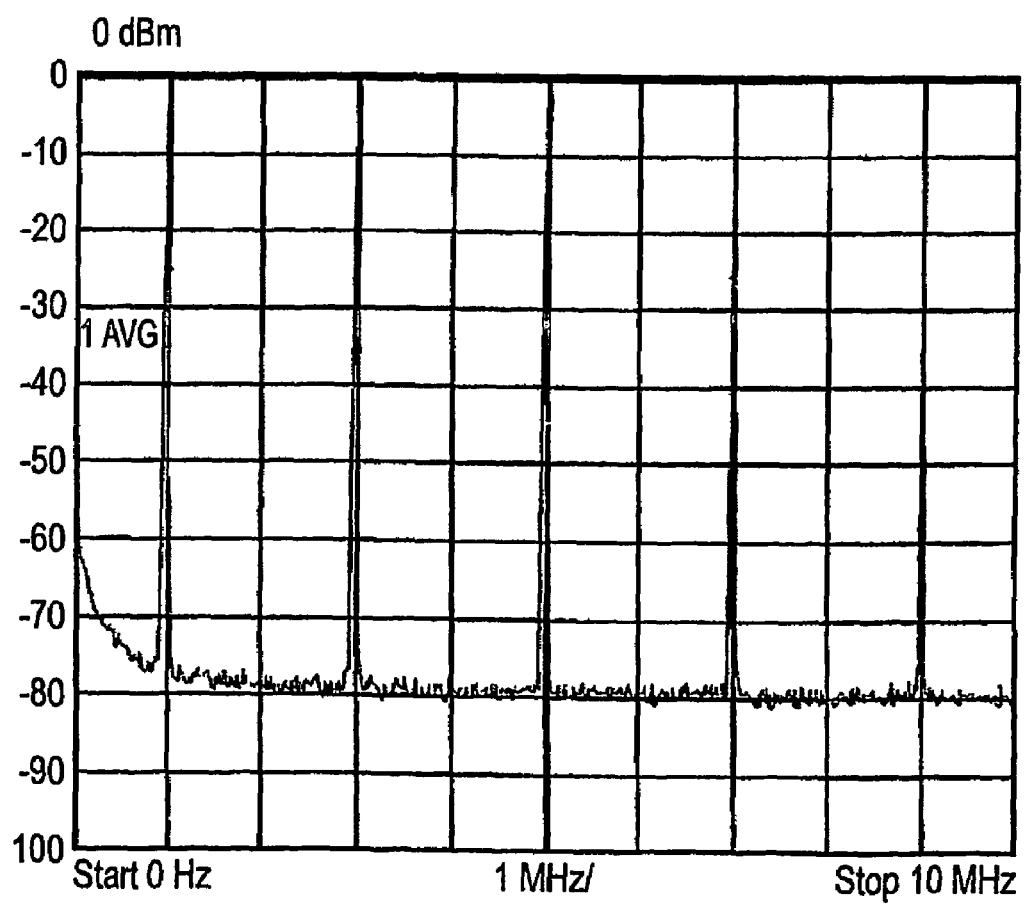
FIG. 17 illustrates the reduction in edge jitter in the frequency domain of an embodiment of the present invention.

In an illustrative example, the compare block in FIG. 15 may be set up to operate as in table 2. Under these circumstances, it would produce the waveforms shown in FIG. 12. This example is written for n=3, though the generalisation to any value of n will be apparent to one skilled in the art. The top n MSBs are examined, and a decision is made as to which region the phase is in.

TABLE 2

| Value of phase word 3 MSBs | Region |
| --- | --- |
| 000, 001 | High |
| 010 | Low going |
| 011, 100, 101, 110 | Low |
| 111 | High going |

In the low going and high going regions, the input phase, which covers $\frac{1}{8}^{th}$ of a cycle in this example, must be scaled to cover ½ cycle at the LUT. This is achieved by a left shift of 2 bit positions, or n−1 bit positions in the general case. As the width of the region that involves a scaling of the phase word is now restricted to $2^n$, it has been possible to replace general multiplier of FIG. 14 with a simple left shift.

This example is for the general case where the duty cycle of the waveform is not 50%. It will be appreciated that yet further savings in logic complexity are possible in the special case of 50% duty cycle.

The fact that the boundaries must lie on multiples of $2^n$ not only restricts the length of the transition regions as previously discussed, but also restricts choice of the length of high and low regions, and hence duty cycle achievable. For reasonably small $2^n$, for instance n–7, a resolution of better than 1% is possible for the duty cycle.

The invention claimed is:

1. A waveform generator for generating a data stream comprising a plurality of data values at predetermined sample times, the data stream being representative of a smooth version of an original waveform, the original waveform including at least one abrupt transition, the waveform generator comprising:
  a phase accumulator arranged to provide an output representative of the phase of the original waveform, the accumulator output being sequentially incremented by a predetermined increment value at successive sample times;
  a transition detector arranged to receive the accumulator output and to provide an output signal when the accumulator output is at least equal to a value representative of the phase of the original waveform at the point of an abrupt transition;
  a phase scaler arranged, in response to receiving the output signal from the transition detector, to determine from the accumulator output the difference between the phase represented by the accumulator output and the phase of the original waveform at the point of the abrupt transition and to convert the phase difference to a time value;
  a data processor arranged to generate a sequence of data values representative of a smooth transition offset by the time value from the sample times; and
  a sequencer arranged to insert said sequence of data values into said data stream.

2. A waveform generator according to claim 1, wherein the data processor is arranged to calculate the sequence of data values representative of the smooth transition in accordance with the time value output from the phase scaler.

3. A waveform generator according to claim 1, further comprising a data storage device having a plurality of predetermined sequences of data values stored thereon, each predetermined sequence of data values being representative of a smooth transition offset by a particular value of the time value output from the phase scaler, the data processor being arranged to select the predetermined sequence of data values corresponding to a particular time value that is closest in value to the time value output from the phase selector.

4. A waveform generator according to claim 1, further comprising an offset generator arranged to receive the output from the phase accumulator, to sum the output value with a predetermined offset value and to provide the product of the summation to the transition detector, wherein the transition detector provides a further output signal representative of a further abrupt transition.

5. A waveform generator according to claim 1, wherein said predetermined increment value is variable.

6. A waveform generator according to claim 1, wherein the smooth transition corresponds substantially to a gaussian pulse response convolved with a square wave.

7. A waveform generator for generating a sequence of data values at predetermined time intervals, the sequence of data values being representative of a smooth version of an original waveform, the original waveform comprising periods of constant amplitude separated by abrupt transitions, the waveform generator comprising:
  a phase accumulator arranged to provide an accumulator output the value of which is incremented by a predetermined value at each predetermined time interval, the accumulator output being representative of the phase of the original waveform;
  a phase mapper arranged to receive the accumulator output and to generate a modified phase output in accordance with the received accumulator output; and
  an output generator arranged to output a data value of said sequence of data values in accordance with the modified phase output received from the phase mapper.

8. A waveform generator according to claim 7, wherein the output generator comprises a look-up table having a plurality of predetermined data values each corresponding to a modified phase output value.

9. A waveform generator according to claim 7, wherein the phase mapper generates a constant modified phase output when the accumulator output is representative of a period of the original waveform having a constant amplitude and wherein said constant modified phase output corresponds to a single data value in the look-up table.

10. A waveform generator according to claim 7, where the phase mapper comprises comparator means for comparing the accumulator output with one or more predetermined threshold values, the or each threshold value defining the boundary between said periods of constant amplitude in the original waveform.

* * * * *